(12) United States Patent
Petitjean et al.

(10) Patent No.: US 10,247,171 B2
(45) Date of Patent: Apr. 2, 2019

(54) SYSTEM AND METHOD FOR COORDINATING WAKE AND NOISE CONTROL SYSTEMS OF A WIND FARM

(71) Applicant: General Electric Company, Schenectady, NY (US)

(72) Inventors: Benoit Philippe Armand Petitjean, Moosburg (DE); Megan Wilson, Greenville, SC (US); Akshay Ambekar, Mauldin, SC (US)

(73) Assignee: General Electric Company, Schenectady, NY (US)

( * ) Notice: Subject to any disclaimer, the term of this patent is extended or adjusted under 35 U.S.C. 154(b) by 229 days.

(21) Appl. No.: 15/181,727

(22) Filed: Jun. 14, 2016

(65) Prior Publication Data

US 2017/0356421 A1 Dec. 14, 2017

(51) Int. Cl.
*F03D 7/04* (2006.01)
*F03D 9/25* (2016.01)
(Continued)

(52) U.S. Cl.
CPC ........... *F03D 7/048* (2013.01); *F03D 7/0296* (2013.01); *F03D 9/257* (2017.02); *G05B 19/054* (2013.01);
(Continued)

(58) Field of Classification Search
CPC .......... F03D 1/06; F03D 7/028; F03D 7/0296; F03D 7/048; F03D 7/0284; F03D 9/257; G05B 19/054; H02S 10/12
See application file for complete search history.

(56) References Cited

U.S. PATENT DOCUMENTS 7,357,622 B2 4/2008 Corten et al.
8,258,643 B2 * 9/2012 Bonnet ..................... F03D 7/02
290/44
(Continued)

FOREIGN PATENT DOCUMENTS

DE 10 2015 114958 A1 3/2017
EP 2 940 295 A1 11/2015
(Continued)

OTHER PUBLICATIONS

International Search Report and Written Opinion issued in connection with corresponding PCT Application No. PCT/US2017/038657 dated Mar. 20, 2018.

*Primary Examiner* — Jennifer L Norton
(74) *Attorney, Agent, or Firm* — Dority & Manning, P.A.

(57) ABSTRACT

A system and method for simultaneously coordinating a wake control system and a noise control system of a wind farm having a plurality of wind turbines is disclosed. The method includes determining, via a farm controller, one or more wake control set points for the wake control system. Further, the method includes determining, via the farm controller, one or more noise control set points for the noise control system. The method also includes selecting, via the farm controller, between the wake control set points and the noise control set points for each of the plurality of wind turbines. Thus, the method also includes sending, via the farm controller, the selected control set points to local controllers of the plurality of wind turbines and operating the wind farm based on the selected control set points.

13 Claims, 6 Drawing Sheets

(51) Int. Cl.
  *G05B 19/05*    (2006.01)
  *F03D 7/02*     (2006.01)
  *H02S 10/12*    (2014.01)

(52) U.S. Cl.
  CPC ............ *F03D 7/0284* (2013.01); *H02S 10/12* (2014.12); *Y02E 10/721* (2013.01); *Y02E 10/723* (2013.01)

(56) References Cited

U.S. PATENT DOCUMENTS

| | | | |
|---|---|---|---|
| 9,086,337 B2* | 7/2015 | Merida | F03D 7/048 |
| 2007/0031237 A1 | 2/2007 | Bonnet | |
| 2007/0299548 A1* | 12/2007 | Weitkamp | F03D 7/046 |
| | | | 700/52 |
| 2010/0143119 A1* | 6/2010 | Kooijman | F03D 7/0212 |
| | | | 416/1 |
| 2011/0006525 A1 | 1/2011 | Cleve et al. | |
| 2011/0153096 A1* | 6/2011 | Pal | F03D 7/047 |
| | | | 700/287 |
| 2011/0175356 A1 | 7/2011 | Nielsen et al. | |
| 2011/0223006 A1 | 9/2011 | Loh et al. | |
| 2011/0223018 A1 | 9/2011 | Srinivasan et al. | |
| 2013/0156577 A1 | 6/2013 | Esbensen et al. | |
| 2013/0166082 A1 | 6/2013 | Ambekar et al. | |
| 2013/0300115 A1 | 11/2013 | Seem et al. | |
| 2014/0017080 A1* | 1/2014 | Porm | F03D 7/02 |
| | | | 416/1 |
| 2015/0071778 A1* | 3/2015 | Delport | F03D 7/0224 |
| | | | 416/1 |
| 2015/0308416 A1 | 10/2015 | Ambekar et al. | |
| 2016/0032874 A1 | 2/2016 | Choi | |
| 2016/0032894 A1 | 2/2016 | Ambekar et al. | |
| 2016/0146190 A1* | 5/2016 | Ravindra | F03D 7/048 |
| | | | 290/44 |
| 2016/0230741 A1* | 8/2016 | Brath | F03D 7/048 |
| 2016/0341180 A1* | 11/2016 | Lee | F03D 7/0224 |
| 2018/0100488 A1* | 4/2018 | Miranda | F03D 7/045 |
| 2018/0283355 A1* | 10/2018 | Miranda | F03D 7/047 |

FOREIGN PATENT DOCUMENTS

| | | |
|---|---|---|
| WO | WO2013023660 A1 | 2/2013 |
| WO | WO2013037374 A1 | 3/2013 |
| WO | 2017/042191 A1 | 3/2017 |

* cited by examiner

SYSTEM AND METHOD FOR COORDINATING WAKE AND NOISE CONTROL SYSTEMS OF A WIND FARM

FIELD OF THE INVENTION

The present invention relates generally to wind farms, and more particularly, to systems and methods for simultaneously coordinating wake and noise control systems of a wind farm.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having one or more rotor blades. The rotor blades transform wind energy into a mechanical rotational torque that drives one or more generators via the rotor. The generators are sometimes, but not always, rotationally coupled to the rotor through the gearbox. The gearbox steps up the inherently low rotational speed of the rotor for the generator to efficiently convert the rotational mechanical energy to electrical energy, which is fed into a utility grid via at least one electrical connection. Such configurations may also include power converters that are used to convert a frequency of generated electric power to a frequency substantially similar to a utility grid frequency.

A plurality of wind turbines are commonly used in conjunction with one another to generate electricity and are commonly referred to as a "wind farm." Wind turbines on a wind farm typically include their own meteorological monitors that perform, for example, temperature, wind speed, wind direction, barometric pressure, and/or air density measurements. In addition, a separate meteorological mast or tower ("met mast") having higher quality meteorological instruments that can provide more accurate measurements at one point in the farm is sometimes provided. The correlation of meteorological data with power output allows the empirical determination of a "power curve" for the individual wind turbines.

Traditionally, wind farms are controlled in a decentralized fashion to generate power such that each turbine is operated to maximize local energy output and to minimize impacts of local fatigue and extreme loads. To this end, each turbine includes a control module, which attempts to maximize power output of the turbine in the face of varying wind and grid conditions, while satisfying constraints like sub-system ratings and component loads.

In addition, many wind turbines of the wind farm have wake management control systems as well as separate wind farm noise control systems. Generally, wake management control modifies wind turbine control by lowering the tip speed ratio (TSR) while increasing pitch set points. In contrast, farm noise control aims to lower rotor speed and increase pitch set points in order to meet certain noise restrictions. Further, wake management control benefits occur essentially in variable speed operation, whereas noise control benefits occur mostly in rated speed operation. As such, there is an overlap where the two control systems compete for control of the wind turbine. This overlap generally happens near the transition from variable speed to rated speed, or potentially earlier if the site has an ambient dependent noise constraint. Thus, the wake management control systems and the noise control systems must operate separately and independently of each other.

In view of the aforementioned, a system and method for coordinating wake and noise control systems of a wind farm that would allow both systems to operate simultaneously would be advantageous.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for simultaneously coordinating a wake control system and a noise control system of a wind farm having a plurality of wind turbines. The method includes determining, via a farm controller, one or more wake control set points for the wake control system. Further, the method includes determining, via the farm controller, one or more noise control set points for the noise control system. The method also includes selecting, via the farm controller, between the wake control set points and the noise control set points for each of the plurality of wind turbines. Thus, the method also includes sending, via the farm controller, the selected control set points to local controllers of the plurality of wind turbines and operating the wind farm based on the selected control set points.

In one embodiment, the step of selecting between the wake control set points and the noise control set points may include using either the wake control set points or the noise control set points as a constraint relative to the other. For example, in certain embodiments, the step of using either the wake control set points or the noise control set points as a constraint relative to the other may include using the noise control set points as a constraint relative to the wake control set points. More specifically, in particular embodiments, the step of using the noise control set points as a constraint relative to the wake control set points may include selecting the wake control set points such that the noise emitted by the wind farm remains below a predetermined threshold.

In another embodiment, the method may include evaluating at least one additional constraint when selecting between the wake control set points and the noise control set points for each of the plurality of wind turbines. More specifically, in certain embodiments, the additional constraint(s) may include a utility-grid power regulation.

In further embodiments, the step of selecting between the wake control set points and the noise control set points for each of the plurality of wind turbines may include selecting the wake control set points for a portion or subset of the wind turbines in the wind farm and the noise control set points for another portion or subset of the wind turbines in the wind farm. Alternatively, the step of selecting between the wake control set points and the noise control set points for each of the wind turbines may include selecting either the wake control set points or the noise control set points for all of the wind turbines in the wind farm.

In additional embodiments, the method may include checking a noise contribution for each of the plurality of wind turbines, providing a combination of wake control set points and noise control set points to each of the local controllers of the plurality of wind turbines, and operating the wind farm based on the combination of wake control set points and noise control set points. In another embodiment, the method may include re-checking the noise contribution for each of the plurality of wind turbines to ensure a benefit exists and local noise regulations are satisfied in response to operating the wind farm based on the combination of wake control set points and noise control set points.

In still further embodiments, the wake control set points, the noise control set points, and/or the selected control set points may generally refer to a tip speed ratio, a pitch angle, a yaw angle, a rotor speed, a generator speed, an electrical power, or any other suitable operational set points for one or more of the wind turbines in the wind farm.

In another aspect, the present disclosure is directed to a method for simultaneously coordinating a wake control system and a noise control system of a wind farm having a plurality of wind turbines. The method includes determining, via a farm controller, one or more combined control set points in-loop for controlling both the wake control system and the noise control system. The method also includes sending, via the farm controller, the one or more combined control set points to one or more local controllers of the plurality of wind turbines. Further, the method includes operating the wind farm based on the one or more combined control set points.

In one embodiment, the step of determining one or more combined control set points in-loop for controlling both the wake control system and the noise control system may include receiving, via the farm controller, one or more operational parameters of the wind farm, inputting the one or more operational parameters into one or more computer models for turbine wake and far-field noise level calculations, integrating the one or more computer models into a multi-variable optimization algorithm, and determining, via the multi-variable optimization algorithm, the one or more combined control set points. It should also be understood that the method may further include any of the additional steps and/or features as described herein.

In yet another aspect, the present disclosure is directed to a system for simultaneously coordinating a wake control system and a noise control system of a wind farm having a plurality of wind turbines. The system includes a farm controller communicatively coupled to one or more local controllers of the one or more wind turbines via a network. At least one of the farm controller or the local controllers is configured to perform one or more operations, including but not limited to determining at least one of one or more wake control set points for the wake control system or one or more noise control set points for the noise control system, selecting between the wake control set points and the noise control set points, and operating the wind farm based on the selected control set points. It should also be understood that the system may further include any of the additional features as described herein.

These and other features, aspects and advantages of the present invention will become better understood with reference the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
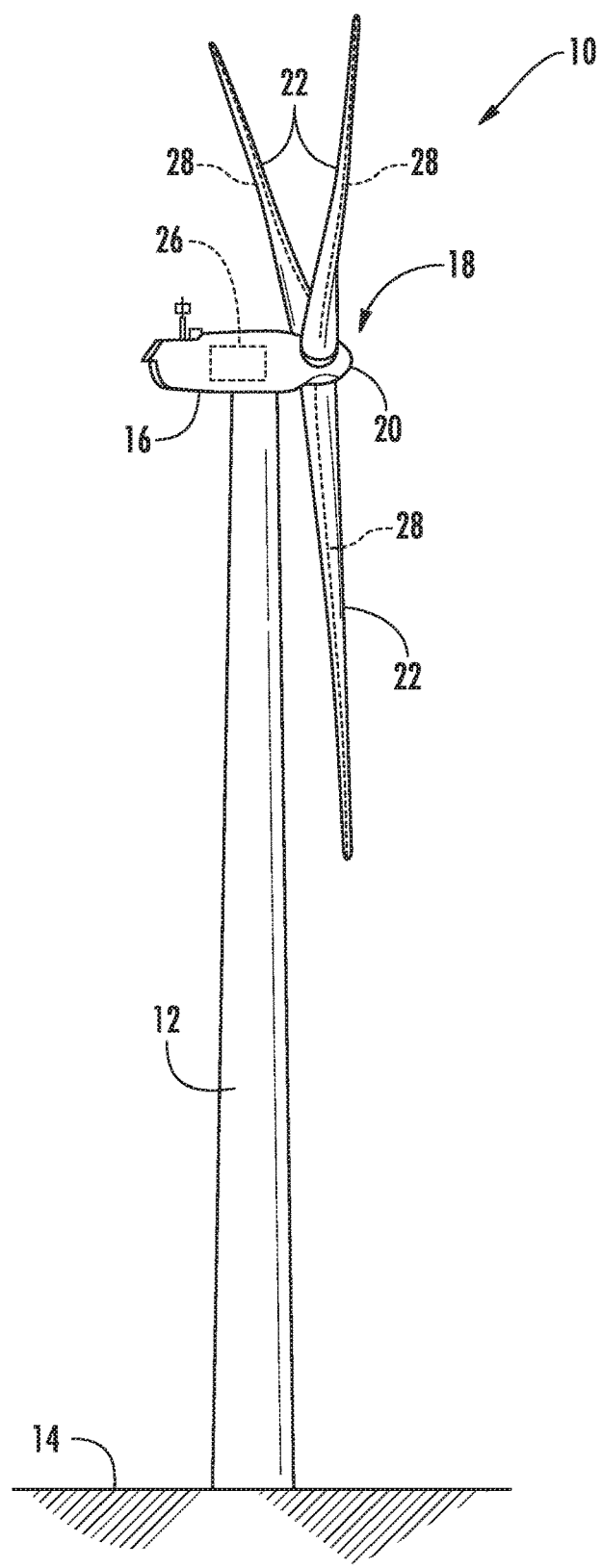
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for coordinating a wake control system and a noise control system of a wind farm (or an individual wind turbine) such that the two systems can be operated simultaneously. For example, in one embodiment, the method may include optimizing and determining set points for both the wake control system and the noise control system separately and using the solution of one as a constraint relative to the other at the controller level. Thus, the method also includes selecting between the wake control set points and the noise control set points for each of the plurality of wind turbines and sending, via the farm controller, the selected control set points to local controllers of the plurality of wind turbines. As such, the wind farm is operated based on the selected control set points. In another embodiment, the method includes determining a combined (in-loop) optimal solution that is passed directly to the local controllers of the wind turbines.

The various embodiments of the system and method of the present disclosure provide numerous advantages not present in the prior art. For example, the present disclosure allows the wake management control system and the noise control system of one or more wind turbines to be operated simultaneously instead of having to select between one or the other. As such, wind farm or individual wind turbine operation can be improved using both technologies rather than benefitting from either wake or noise control. Further, for certain embodiments, changes in individual turbine operation from noise optimization can be accounted for as part of the wake optimization, and vice versa. Moreover, though the description focuses the present technology being applied to wind farms, it should be understood by those of ordinary skill in the art that the present control scheme can also be applied to individual wind turbine control.

Referring now to the drawings, FIG. 1 illustrates a perspective view of one embodiment of a wind turbine 10 configured to implement the control technology according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
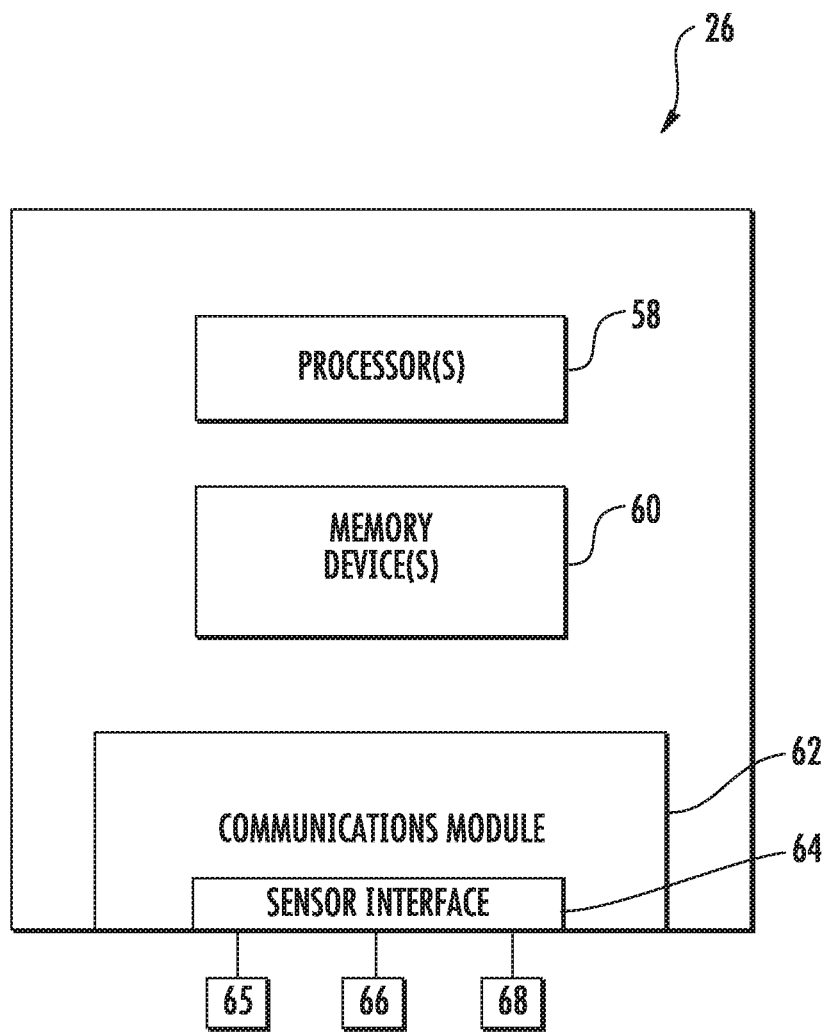
FIG. 2 illustrates a schematic view of one embodiment of a controller for use with the wind turbine shown in FIG. 1.

The wind turbine 10 may also include a wind turbine controller 26 centralized at the base the tower 12, e.g. in electronic cabinets and/or within the nacelle 16 (as shown in FIG. 2). However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes of the wind turbine 10 (e.g., start-up or shut-down sequences), de-rate or up-rate the wind turbine 10, and/or control various components of the wind turbine 10. For example, the controller 26 may be configured to control the blade pitch or pitch angle of each of the rotor blades 22 (i.e., an angle that determines a perspective of the rotor blades 22 with respect to the direction of the wind) to control the power output generated by the wind turbine 10 by adjusting an angular position of at least one rotor blade 22 relative to the wind. For instance, the controller 26 may control the pitch angle of the rotor blades 22 by rotating the rotor blades 22 about a pitch axis 28, either individually or simultaneously, by transmitting suitable control signals to a pitch drive or pitch adjustment mechanism (not shown) of the wind turbine 10.

Referring now to FIG. 2, a block diagram of one embodiment of suitable components that may be included within the controller 26 is illustrated in accordance with aspects of the present disclosure. As shown, the controller 26 may include one or more processor(s) 58 and associated memory device(s) 60 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, application-specific processors, digital signal processors (DSPs), Application Specific Integrated Circuits (ASICs), Field Programmable Gate Arrays (FPGAs), and/or any other programmable circuits. Further, the memory device(s) 60 may generally include memory element(s) including, but are not limited to, computer readable medium (e.g., random access memory (RAM)), computer readable non-volatile medium (e.g., a flash memory), one or more hard disk drives, a floppy disk, a compact disc-read only memory (CD-ROM), compact disk-read/write (CD-R/W) drives, a magneto-optical disk (MOD), a digital versatile disc (DVD), flash drives, optical drives, solid-state storage devices, and/or other suitable memory elements.

Additionally, the controller 26 may also include a communications module 62 to facilitate communications between the controller 26 and the various components of the wind turbine 10. For instance, the communications module 62 may include a sensor interface 64 (e.g., one or more analog-to-digital converters) to permit the signals transmitted by one or more sensors 65, 66, 68 to be converted into signals that can be understood and processed by the controller 26. Furthermore, it should be appreciated that the sensors 65, 66, 68 may be communicatively coupled to the communications module 62 using any suitable means. For example, as shown in FIG. 2, the sensors 65, 66, 68 are coupled to the sensor interface 64 via a wired connection. However, in alternative embodiments, the sensors 65, 66, 68 may be coupled to the sensor interface 64 via a wireless connection, such as by using any suitable wireless communications protocol known in the art. For example, the communications module 62 may include the Internet, a local area network (LAN), wireless local area networks (WLAN), wide area networks (WAN) such as Worldwide Interoperability for Microwave Access (WiMax) networks, satellite networks, cellular networks, sensor networks, ad hoc networks, and/or short-range networks. As such, the processor 58 may be configured to receive one or more signals from the sensors 65, 66, 68.

The sensors 65, 66, 68 may be any suitable sensors configured to measure any operational data and/or parameters of the wind turbine 10 and/or wind conditions of the wind farm 200. For example, the sensors 65, 66, 68 may include blade sensors for measuring a pitch angle of one of the rotor blades 22 or for measuring a loading acting on one of the rotor blades 22; generator sensors for monitoring the generator (e.g. torque, rotational speed, acceleration and/or the power output); and/or various wind sensors for measuring various wind parameters (e.g. wind speed, wind direction, etc.). Further, the sensors 65, 66, 68 may be located near the ground of the wind turbine 10, on the nacelle 16, on a meteorological mast of the wind turbine 10, or any other location in the wind farm.

It should also be understood that any other number or type of sensors may be employed and at any location. For example, the sensors may be accelerometers, pressure sensors, strain gauges, angle of attack sensors, vibration sensors, MIMU sensors, camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors. It should be appreciated that, as used herein, the term "monitor" and variations thereof indicates that the various sensors of the wind turbine 10 may be configured to provide a direct measurement of the parameters being monitored or an indirect measurement of such parameters. Thus, the sensors 65, 66, 68 may, for example, be used to generate signals relating to the parameter being monitored, which can then be utilized by the controller 26 to determine the actual condition.

Figure 3:
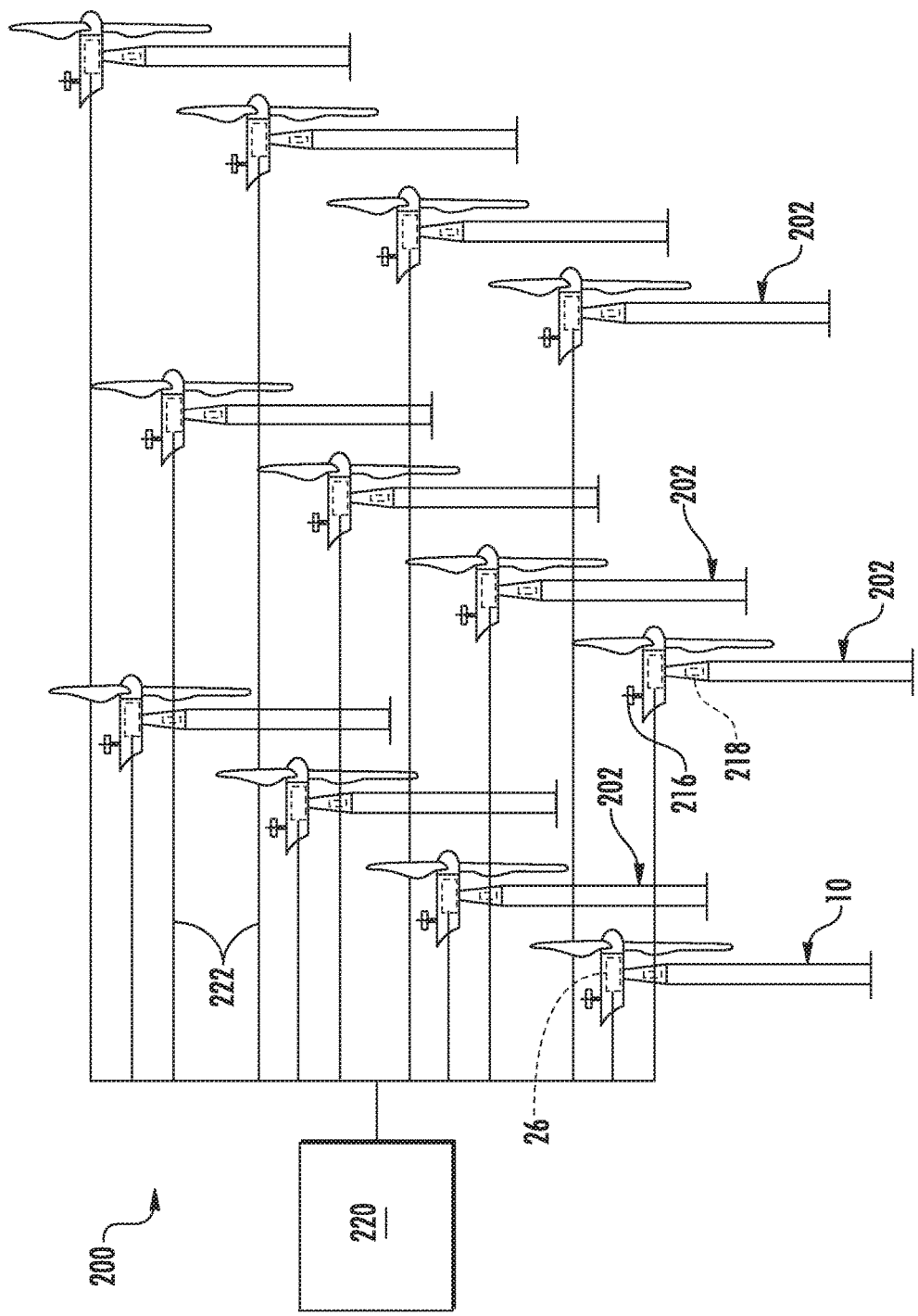
FIG. 3 illustrates a schematic view of one embodiment of a wind farm according to the present disclosure.

Referring now to FIG. 3, a wind farm 200 that is controlled according to the system and method of the present disclosure is illustrated. As shown, the wind farm 200 may include a plurality of wind turbines 202, including the wind turbine 10 described above, and a farm controller 220. For example, as shown in the illustrated embodiment, the wind farm 200 includes twelve wind turbines, including wind turbine 10. However, in other embodiments, the wind farm 200 may include any other number of wind turbines, such as less than twelve wind turbines or greater than twelve wind turbines. In one embodiment, the controller 26 of the wind turbine 10 may be communicatively coupled to the farm controller 220 through a wired connection, such as by connecting the controller 26 through suitable communicative links 222 (e.g., a suitable cable). Alternatively, the controller 26 may be communicatively coupled to the farm controller 220 through a wireless connection, such as by using any suitable wireless communications protocol known in the art. In addition, the farm controller 220 may be generally configured similar to the controllers 26 for each of the individual wind turbines 202 within the wind farm 200.

As mentioned, one or more of the wind turbines 202 in the wind farm 200 may include a plurality of sensors for monitoring various operational data of the individual wind turbines 202 and/or one or more wind parameters of the wind farm 200. For example, as shown in FIG. 3, each of the wind turbines 202 includes a wind sensor 216, such as an anemometer or any other suitable device, configured for measuring wind speeds or any other wind parameter. For example, in one embodiment, the wind parameters include information regarding at least one of or a combination of the following: a wind gust, a wind speed, a wind direction, a wind acceleration, a wind turbulence, a wind shear, a wind veer, a wake, SCADA information, or similar.

As is generally understood, wind speeds may vary significantly across a wind farm 200. Thus, the wind sensor(s) 216 may allow for the local wind speed at each wind turbine 202 to be monitored. In addition, the wind turbine 202 may also include one or more additional sensors 218. For instance, the sensors 218 may be configured to monitor electrical properties of the output of the generator of each wind turbine 202, such as current sensors, voltage sensors, temperature sensors, or power sensors that monitor power output directly based on current and voltage measurements. Alternatively, the sensors 218 may include any other sensors that may be utilized to monitor the power output of a wind turbine 202. It should also be understood that the wind turbines 202 in the wind farm 200 may include any other suitable sensor known in the art for measuring and/or monitoring wind parameters and/or wind turbine operational data.

Figure 4:
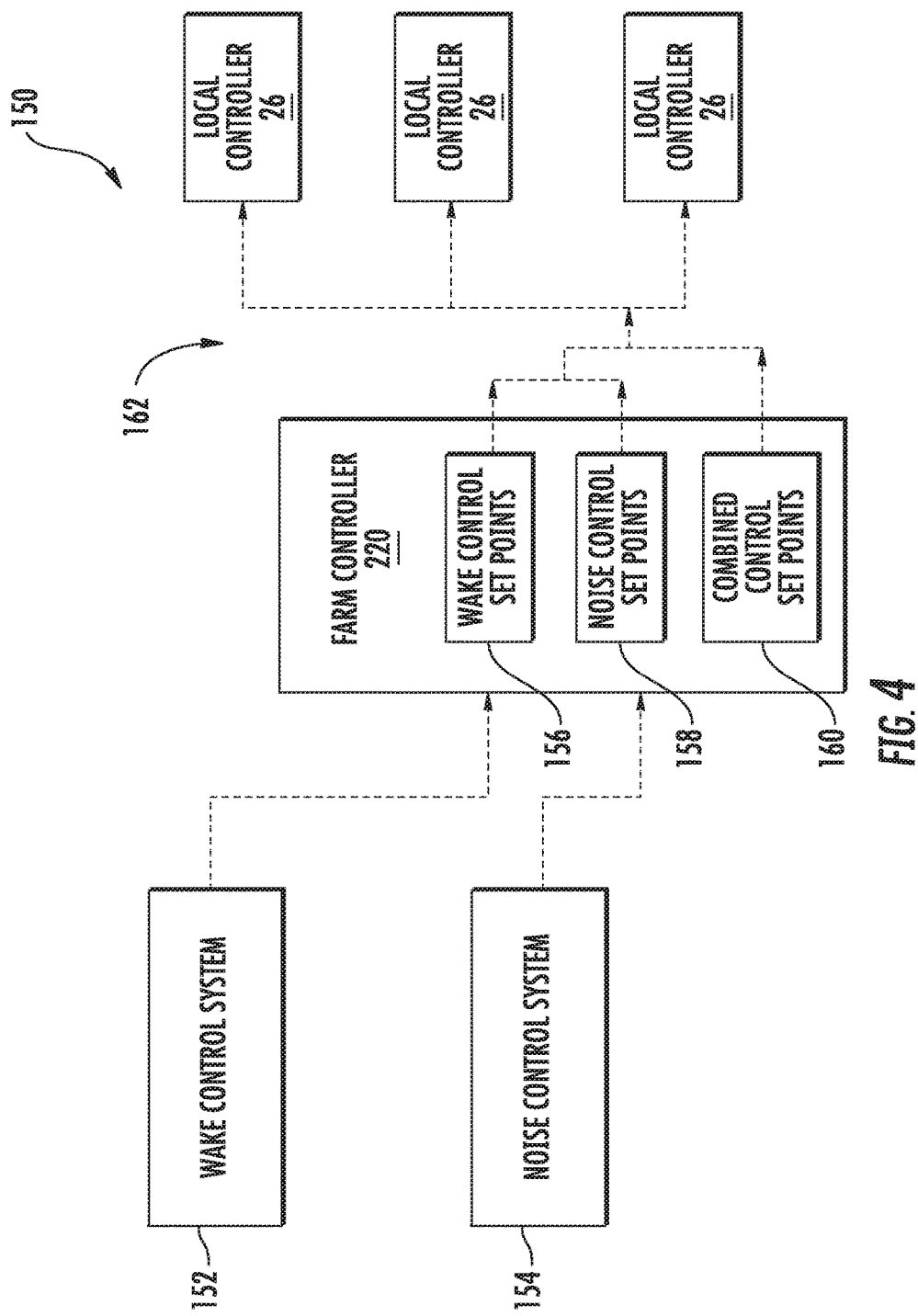
FIG. 4 illustrates a schematic diagram of one embodiment of a system for simultaneously coordinating a wake control system and a noise control system of a wind farm according to the present disclosure.
Figure 5:
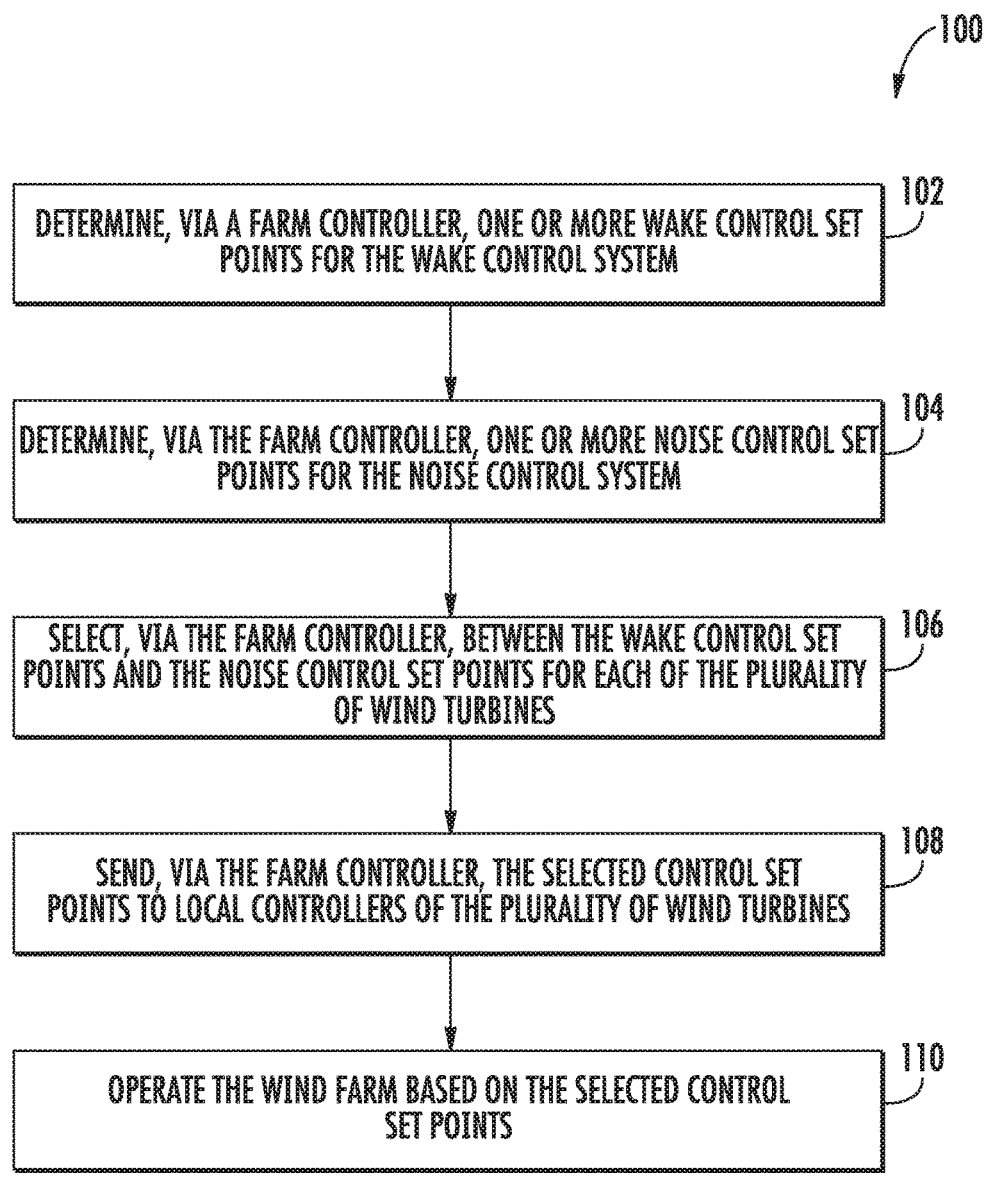
FIG. 5 illustrates a flow diagram of one embodiment of a method for simultaneously coordinating a wake control system and a noise control system of a wind farm according to the present disclosure.

Referring now to FIGS. 4 and 5, a system 150 and method 100 for simultaneously coordinating a wake control system 152 and a noise control system 154 of a wind farm, e.g. the wind farm 200 of FIG. 3, according to the present disclosure are illustrated, respectively. For example, in one embodiment, the farm controller 220, the individual wind turbine controllers 26, and/or a separate computer may be configured to perform any of the steps of the method 100 as described herein. Further, in one embodiment, the method 100 of the present disclosure may be performed manually via a separate computer not associated with the wind farm 200.

Thus, as shown at 102, the method 100 includes determining, e.g. via the farm controller 220 or the turbine controller 26, one or more wake control set points 156 for the wake control system 152. As such, wake control set points may be chosen for the entire wind farm 200 or for each individual wind turbine 202 in the farm 200. As shown at 104, the method 100 includes determining, e.g. via the farm controller 220 or the turbine controller 26, one or more noise control set points 158 for the noise control system 154. Therefore, like the wake control set points, the noise control set points may be chosen for the entire wind farm 200 or for each individual wind turbine 202 in the farm 200. More specifically, in certain embodiments, the wake and/or noise control set points may be determined via a mathematical model (for wake or for far-field noise propagation) and/or a multivariable optimization routine. In both cases, the goal is to identify the set points that will maximize energy yield and minimize wake interaction (wake optimization) and satisfy all noise constraints around the wind farm (noise optimization).

In further embodiments, the wake control set points may be determined according to U.S. Patent Application No.: 2015/0308416, entitled "Systems and Methods for Optimizing Operation of Wind Farm" filed on Apr. 21, 2015, which is incorporated herein by reference in its entirety. Similarly, the noise control set points may be determined according to U.S. Patent Application No.: 2016/0032874 entitled "System and Method for Optimal Operation of Wind Farm" filed on Jul. 30, 2015, and U.S. Patent Application No.: 2016/0032874 entitled "System, Device, and Method for Noise-Based Operation of Wind Turbines" filed on Dec. 6, 2010, which are incorporated herein by reference in their entirety. As used herein, the wake control set points 156 and/or the noise control set points 158 may generally refer to a tip speed ratio, a pitch angle, a yaw angle, a rotor speed, a generator speed, an electrical power, or any other suitable operational set points for one or more of the wind turbines in the wind farm 200.

As shown at 106, the method 100 includes selecting, e.g. via the farm controller 220, between the wake control set points 156 and the noise control set points 158 for each of the plurality of wind turbines 202. More specifically, in one embodiment, the step of selecting between the wake control set points 156 and the noise control set points 158 may include using either the wake control set points 156 or the noise control set points 158 as a constraint relative to the other for each of the turbines 202. For example, in certain embodiments, the method 100 may include using the noise control set points 158 as a constraint relative to the wake control set points 156. More specifically, in particular embodiments, the method 100 may include selecting the wake control set points 156 such that the noise emitted by the wind farm remains below a predetermined threshold. In other words, for certain embodiments, noise control set points should be handled as a constraint since noise is generally a regulatory requirement, whereas wake control is not a requirement, but leads to an increase in overall farm-level annual energy production (AEP) over nominal operation. As such, optimal wake control set points can be directly used when such control set points do not lead to noise violations.

In this approach, the noise control set points can be checked at the individual turbine level and a mix of wake and noise control set points can be distributed across the wind farm 200 at any given instant in time. Due to the potential combination of control set points selections, it is desirable in certain embodiments to also have an additional check to validate that the combination of control set points actually result in a benefit over nominal operation since the optimized wake control set points assume no outside control changes have been made and the expected benefit trade-off may not work if the control at the downstream turbine(s) 202 has been otherwise modified.

For example, in certain embodiments, the controller 26, 220 is configured to select a combination of wake/noise points for the wind farm 200. The selection at each wind turbine 202, however, can have an impact elsewhere in the wind farm 200. As such, the controller 220 can also be programmed with a higher level routine that iterates between these point selections to ensure the optimal combination of set points are chosen for each turbine 202 in the farm 200. For example, if there are two wind turbines in the wind farm, Turbine A and Turbine B, and the controller 220 selects noise set points for Turbine A and wake set points for Turbine B, the following scenarios can occur: first, the wake set points selected for Turbine B may reduce the overall noise, meaning the controller 220 should have actually picked different noise set points at Turbine A; second, if Turbine B is upstream of any turbine (e.g. Turbine A or a new Turbine C), then using the noise set points at Turbine A will likely also impact the wake set points selected from Turbine B.

Thus, the method 100 may also include checking a noise contribution for each of the wind turbines 202 after the control set points have been sent to the local controllers 26, providing a combination of wake control set points and noise control set points to each of the local controllers 26 of the wind turbines 202, and operating the wind farm 200 based on the combination of wake control set points 156 and noise control set points 158. In another embodiment, the method 100 may further include re-checking the noise contribution for each of the wind turbines 202 to ensure a benefit exists in response to operating the wind farm 200 based on the combination of wake control set points 156 and noise control set points 158.

In another embodiment, the method 100 may include evaluating at least one additional constraint when selecting between the wake control set points 156 and the noise control set points 158 for each of the wind turbines 202. More specifically, in certain embodiments, the additional constraint(s) may include a utility-grid power regulation.

In further embodiments, the step of selecting between the wake control set points 156 and the noise control set points 158 for each of the wind turbines 202 may include selecting the wake control set points 156 for a portion or subset of the wind turbines 202 and selecting the noise control set points 158 for another portion of the wind turbines 202. Alternatively, the step of selecting between the wake control set points 156 and the noise control set points 158 for each of the wind turbines 202 may include selecting either the wake control set points 156 or the noise control set points 158 for all of the wind turbines 202 in the wind farm 200.

Referring still to FIG. 5, as shown at 108, the method 100 also includes sending, e.g. via the farm controller 220, the selected control set points to the local controllers 26 of the wind turbines 202 that are connected to the farm controller 220 via a network 162. Thus, as shown at 110, the method 100 includes operating the wind farm 200 based on the selected control set points. In such an embodiment, the wake/noise optimizations are handled separately.

Alternatively, the present disclosure may include a binary selection between wake/noise set points at the farm level, where all of the wind turbines 202 in the wind farm 200 default either to wake or noise optimized set points, rather than a mix of wake and noise control set points distributed across the wind farm 200 at the individual turbine-level as previously described.

In another embodiment, the system 150 may be configured to determine either one of one or more wake control set points for the wake control system or one or more noise control set points for the noise control system. In other words, one of the two control systems may be fully defined separately upfront (i.e. offline) and its results are known and leveraged in-loop by the other optimization. As such, the system 150 may select between the wake control set points and the noise control set points and operate the wind farm 200 based on the selected control set points.

Figure 6:
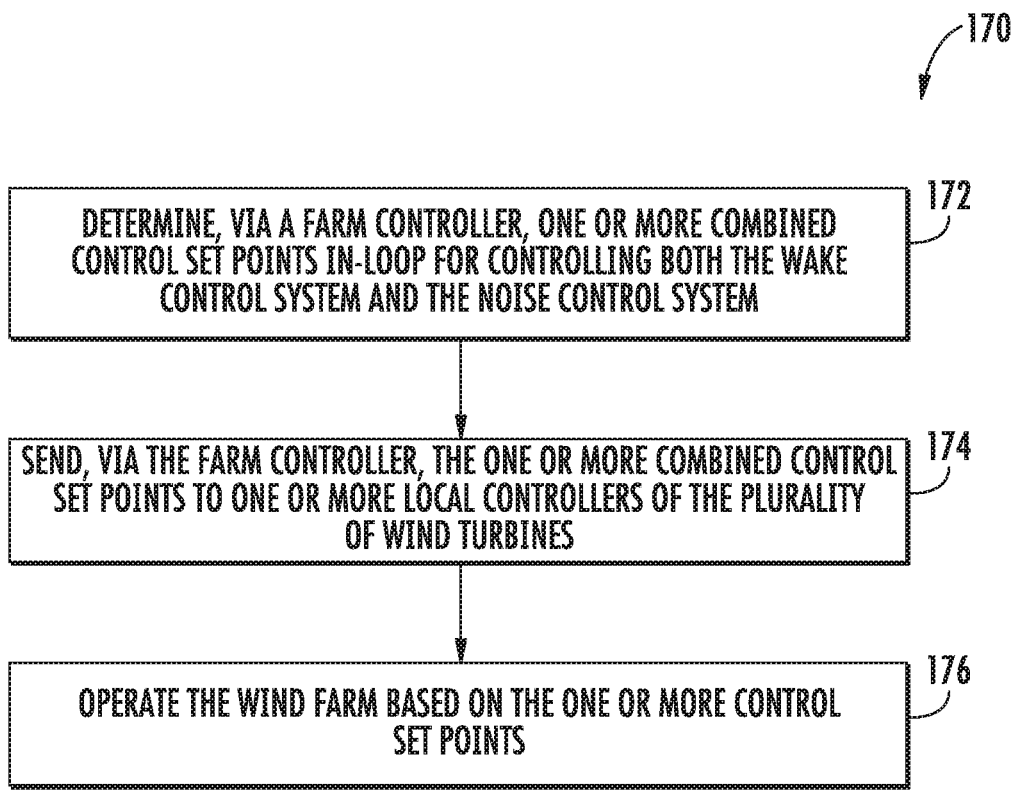
FIG. 6 illustrates a flow diagram of another embodiment of a method for simultaneously coordinating a wake control system and a noise control system of a wind farm according to the present disclosure.

Referring now to FIG. 6, a flow diagram of another embodiment of a method 170 for simultaneously coordinating a wake control system 152 and a noise control system 154 of the wind farm 200 according to the present disclosure is illustrated. As shown at 172, the method 150 includes determining, e.g. via the farm controller 220, one or more combined control set points 160 in-loop for controlling both the wake control system 152 and the noise control system 154. In one embodiment, for example, the combined control set points may generally refer to a tip speed ratio, a pitch angle, a yaw angle, a rotor speed, a generator speed, an electrical power, or any other suitable operational set points for one or more of the wind turbines 202 in the wind farm 200.

More specifically, in one embodiment, the step of determining one or more combined control set points 160 in-loop for controlling both the wake control system 152 and the noise control system 154 may include receiving one or more operational parameters of the wind farm 200 and inputting the operational parameters into a computer models (to calculate turbine wakes and far-field noise levels) and multivariable optimization algorithms to determine the most-suitable control set points. In certain embodiments, the operational parameter(s) as described herein may include any data of the wind farm 200 and/or the individuals wind turbines 202, including but not limited to power output, generator speed, torque output, grid conditions, pitch angle, tip speed ratio, yaw angle, loading conditions, geographical information, temperature, pressure, wind turbine location, wind farm location, weather conditions, wind gusts, wind speed, wind direction, wind acceleration, wind turbulence, wind shear, wind veer, wake, or similar. Thus, in particular embodiments, the computer models may include one or more algorithms stored therein configured for handling the competing control signals of the wake and noise control systems that occur between the two optimal solutions. As such, the computer model is configured to determine the combined control set points 160 in-loop as a function of the operational parameters and/or properties of the wind farm 200, e.g. such as location, terrain, turbine layout, etc.

Referring still to FIG. 6, as shown at 154, the method 150 includes sending, via the farm controller 220, the one or more combined control set points 160 to one or more local controllers 26 of the plurality of wind turbines 202. Further, as shown at 156, the method 150 includes operating the wind farm based 200 on the one or more combined control set points. As such, it should be understood that the present disclosure includes cases where wake and noise optimization are either handled entirely separately or entirely together, as well as cases where one of the two is handled separately upfront (i.e. noise) and its results are known in-loop by the other optimization (i.e. wake).

In addition, the present disclosure is largely described herein with the control decisions being made at the farm-level, i.e. via the farm controller 202, which has visibility to all of the wind turbines 202 simultaneously. However, further embodiments include taking a distributed approach where decisions are made locally by each wind turbine 202 in the wind farm 200, or by a sub-group of wind turbines 202 in the wind farm 200.

Further, it should be understood that the present disclosure is configured to select the wake control set points and/or the noise control set points "online." Such online optimization properly handles the case of wind turbines that are occasionally offline in the optimization considerations and is adaptable to other external constraints. Further, online systems have the ability to ensure that tradeoff benefits exist before a mix of wake/noise set points are sent to the local turbine controllers. Alternatively, the present disclosure may also be configured to select the wake control set points and/or the noise control set points "offline." In such an embodiment, the optimization may be completed upfront and simply pulled from a lookup table in real-time.

Exemplary embodiments of a wind farm, a controller for a wind farm, and a method for controlling a wind farm are described above in detail. The method, wind farm, and controller are not limited to the specific embodiments described herein, but rather, components of the wind turbines and/or the controller and/or steps of the method may be utilized independently and separately from other components and/or steps described herein. For example, the controller and method may also be used in combination with other power systems and methods, and are not limited to practice with only the wind turbine controller as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for simultaneously coordinating a wake control system and a noise control system of a wind farm having a plurality of wind turbines, the method comprising:
   determining, via a farm controller, one or more wake control set points for the wake control system;
   determining, via the farm controller, one or more noise control set points for the noise control system;
   selecting, via the farm controller, between the wake control set points and the noise control set points for each of the plurality of wind turbines using either the wake control set points or the noise control set points as a constraint relative to the other;
   sending, via the farm controller, the selected control set points to local controllers of the plurality of wind turbines; and
   modifying, via the local controllers, existing set points of the plurality of wind turbines of the wind farm with the selected control set points and operating the plurality of wind turbines at the selected control set points, wherein the wake control set points, the noise control set points and the selected control set points comprise of at least one of a tip speed ratio, a pitch angle, a yaw angle, a rotor speed, an electrical power or a generator speed.

2. The method of claim 1, wherein using either the wake control set points or the noise control set points as a constraint relative to the other further comprises using the noise control set points as a constraint relative to the wake control set points.

3. The method of claim 2, wherein using the noise control set points as a constraint relative to the wake control set points further comprises selecting the wake control set points such that noise emitted by the wind farm remains below a predetermined threshold.

4. The method of claim 1, further comprising evaluating at least one additional constraint when selecting between the wake control set points and the noise control set points for each of the plurality of wind turbines.

5. The method of claim 4, wherein that at least one additional constraint comprises a utility-grid power regulation.

6. The method of claim 1, wherein selecting between the wake control set points and the noise control set points for each of the plurality of wind turbines further comprises selecting the wake control set points for a portion of the wind turbines and the noise control set points for another portion of the wind turbines.

7. The method of claim 1, wherein selecting between the wake control set points and the noise control set points for each of the plurality of wind turbines further comprises selecting either the wake control set points or the noise control set points for all of the plurality of wind turbines.

8. The method of claim 1, further comprising checking a noise contribution for each of the plurality of wind turbines, providing a combination of wake control set points and noise control set points to each of the local controllers of the plurality of wind turbines, and operating the wind farm based on the combination of wake control set points and noise control set points.

9. The method of claim 8, further comprising re-checking the noise contribution for each of the plurality of wind turbines to ensure a benefit exists in response to operating the wind farm based on the combination of wake control set points and noise control set points.

10. A system for simultaneously coordinating a wake control system and a noise control system of a wind farm having a plurality of wind turbines, the system comprising:
   a farm controller communicatively coupled to one or more local controllers of the one or more wind turbines via a network, at least one of the farm controller or the local controllers configured to perform one or more operations, the one or more operations comprising:
   determining at least one of one or more wake control set points for the wake control system or one or more noise control set points for the noise control system,
   selecting between the wake control set points and the noise control set points using either the wake control set points or the noise control set points as a constraint relative to the other; and
   modifying, via the local controllers, existing set points of the plurality of wind turbines of the wind farm with the selected control set points and operating the plurality of wind turbines at the selected control set points, wherein the selected control set points comprise of at least one of a tip speed ratio, a pitch angle, a yaw angle, a rotor speed, an electrical power or a generator speed.

11. The system of claim 10, wherein using either the wake control set points or the noise control set points as a constraint relative to the other points further comprises selecting the wake control set points such that the noise emitted by the wind farm remains below a predetermined threshold.

12. The system of claim 10, comprising checking a noise contribution for each of the plurality of wind turbines, providing a combination of wake control set points and noise control set points to each of the local controllers of the plurality of wind turbines, and operating the wind farm based on the combination of wake control set points and noise control set points.

13. The system of claim 12, further comprising re-checking the noise contribution for each of the plurality of wind turbines to ensure a benefit exists in response to operating the wind farm based on the combination of wake control set points and noise control set points.

\* \* \* \* \*